(12) United States Patent
Terauchi et al.

(10) Patent No.: US 7,115,702 B2
(45) Date of Patent: Oct. 3, 2006

(54) BINDER RESIN FOR TONER AND TONERS

(75) Inventors: Tomoya Terauchi, Sodegaura (JP); Keiichi Ishikawa, Sodegaura (JP); Linwood Blanton Muire, III, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/521,759

(22) PCT Filed: Aug. 1, 2003

(86) PCT No.: PCT/JP03/09811

§ 371 (c)(1),
(2), (4) Date: Jan. 19, 2005

(87) PCT Pub. No.: WO2004/013702

PCT Pub. Date: Feb. 12, 2004

(65) Prior Publication Data
US 2006/0167214 A1    Jul. 27, 2006

(30) Foreign Application Priority Data
Aug. 1, 2002 (JP) .............................. 2002-225139
Aug. 1, 2002 (JP) .............................. 2002-225151
Feb. 3, 2003 (JP) .............................. 2003-025883

(51) Int. Cl.
*C08G 63/00* (2006.01)
(52) U.S. Cl. .................... 528/272; 430/108.4; 528/271
(58) Field of Classification Search ............. 430/108.4; 528/271, 272
See application file for complete search history.

(56) References Cited

U.S. PATENT DOCUMENTS
5,968,701 A    10/1999    Onuma et al.

FOREIGN PATENT DOCUMENTS

| JP | 9-302082 A | 11/1997 |
|----|------------|---------|
| JP | 09302082 | * 11/1997 |
| JP | 10-10777 A | 1/1998 |
| JP | 11-60703 A | 3/1999 |
| JP | 1160703 | * 3/1999 |
| JP | 11-282203 A | 10/1999 |
| JP | 11-305481 A | 11/1999 |
| JP | 2000-39738 A | 2/2000 |
| JP | 2000-234011 A | 8/2000 |
| JP | 2000-275902 A | 10/2000 |
| JP | 2001-324832 A | 11/2001 |
| JP | 2002-148867 A | 5/2002 |
| KR | 279 691 | 7/1999 |

* cited by examiner

*Primary Examiner*—Terressa Boykin
(74) *Attorney, Agent, or Firm*—Buchanan Ingersoll & Rooney PC

(57) ABSTRACT

A binder resin for toner which is excellent in low-temperature fixing property and offset resistance as well as smear resistance, while responding to the demand of the market from the perspectives of environmental protection, such as being free from a bisphenol A structure and tin, and a toner using the same. The binder resin for toner can be obtained using a catalyst containing titanium or germanium, preferably comprises the structure derived from branched or alicyclic alcohols, and comprises the structure derived from terephthalic acid as the acid component, which represents greater than or equal to 60 mol % with respect to the number of moles of all acid components, and a toner using the same.

7 Claims, No Drawings

BINDER RESIN FOR TONER AND TONERS

TECHNICAL FIELD

The present invention relates to a polyester-based binder resin for toner and a toner. More particularly, the present invention relates to a binder resin for an electrophotographic toner which provides highly balanced performance for toner, such as hot offset resistance, fixing property or the like, and an electrophotographic toner.

BACKGROUND ART

Recently, the performance required from copier machines or printers using electrophotography has highly increased. In general, electrophotography for copiers or printers involves a method in which a latent electrostatic image is formed on a photoconductor, subsequently the latent image is developed using the toner, the toner image is transferred onto a sheet to be fixed, for example, paper, and then the sheet is hot-pressed by means of a heat roller (heat roller fixing method). In this heat roller fixing method, improved economic situation such as in electricity consumption, increased copying speed and the like have led to a demand for a toner with good fixing property to fix the image at lower temperatures. On the other hand, in the heat roller fixing method, there is a problem of so-called the offset phenomenon in which since the surface of the heat roller is brought into contact with the toner in a molten state, the toner adheres and is transferred to the surface of the heat roller, and this adhered toner is re-transferred to a subsequent sheet to be fixed, making the sheet contaminated. The feature of not causing this offset phenomenon is one of demands for the important toner performance. Moreover, copiers and printers with higher speeds increasingly require better performance in the charging area. Thus, a toner needs much higher durability, and therefore long-term stability in plate wear is required.

Generally, there is an attempt to lower the fixing temperature by lowering the molecular weight of binding resins (binder resins), in order to make the fixing property better. However, although lowering of the molecular weight decreases the resin viscosity, it also decreases the resin strength and the cohesive power of resin at the same time, resulting in problems such as decreased toner durability and the offset phenomenon occurring about the fixing roller. In addition, there have been attempts to use as such a binding resin, a mixture of a high molecular weight resin and a low molecular weight resin, such that the mixture has a broad molecular weight distribution, or to use a binder resin with the high molecular weight portion further crosslinked. However, in these methods, the viscosity of the resin is increased, and to the contrary to the above case, it is difficult to satisfy the fixing quality.

A variety of toners have been suggested which use, instead of those styrene-acrylic resins that have been predominantly used hitherto as such binding resins required of contradictory functions, polyester resins that are rather of higher density as binder resins, (see, for example, Japanese Unexamined Patent Application Publication Nos. 61-284771 and 62-291668, Japanese Examined Patent Application Publication Nos. 7-101318, 8-3663, and U.S. Pat. No. 4,833,057); however, presently it cannot be stated that they sufficiently satisfy, in particular, the recent increasing demands of the market. Moreover, as it is being considered proper in the market to use double-sided printing and double-sided copying in view of saving resources and protecting the environment, from this point of view there is a demand on an improvement in smear resistance, in addition to the fixing property and the offset resistance.

In addition, there have been conventionally used, bisphenol A derivatives as a raw material of a toner using a polyester resin, or tin-based catalysts as the catalyst for preparation of polyester. Meanwhile, there is a recent demand in the market from the perspective of environmental protection, on products that do not contain bisphenol A, tin or the like, as there is an opinion that these substances may have adverse effects on the environment in various ways.

Furthermore, from another perspective of saving resources, owing to the exhaustion of resources associated with recent increase in population and extension in energy consumption, saving of resources and energy as well as recycling of resources are highly desired. PET bottles, inter alia, that are collected from local communities are increasingly used in textiles or containers, and there is also a demand for further development of new applications.

DISCLOSURE OF INVENTION

Therefore, it is an object of the present invention to provide a binder resin for toner and a toner having high performance, especially excellent smear resistance, while responding to the demand of the market for the saving of resources and environmental protection.

The inventors have conducted an extensive investigation in order to achieve the above object and have accomplished the invention as described below.

Thus, the first aspect of the present invention is a binder resin for toner comprising a polyester structure consisting at least of a structure derived from carboxylic acid and a structure derived from alcohol, characterized in that it contains the structural unit of the following formula [I] in an amount of 1 mol % or less with respect to all the structural units derived from alcohol:

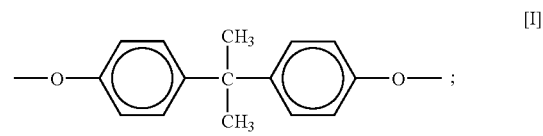

the content of tin is 5 ppm or less;

the content of an element selected from titanium, germanium and aluminum is 10 ppm to 1500 ppm; and the melting temperature is greater than or equal to 110° C.

The second aspect of the present invention is a binder resin for toner, characterized in that it contains 0.1 to 10 mol % of a structural unit derived from an isocyanate compound, when the sum of all the structural units derived from carboxylic acid and of all the structural units derived from alcohol is taken to be 100 mol %.

The third aspect of the present invention is a binder resin for toner containing 0 to 40% by mass of THF-insoluble components, and 100 to 60% by mass of THF-soluble components.

The fourth aspect of the present invention is a binder resin for toner characterized in that at least 60 mol % of the structure derived from carboxylic acid comprises a structure derived from terephthalic acid, at least 40 mol % of the structural units derived from alcohol comprises a structure derived from ethylene glycol, and at least 75 mol % of the structural units derived from alcohol comprises structures derived from ethylene glycol and neopentyl glycol.

The fifth aspect of the present invention is a binder resin for toner comprising a structure of polyester consisting at least of a structure derived from carboxylic acid and a structure derived from alcohol, characterized in that it is obtained from 10 to 60% by mass of polyester resin (A) having an OH number of 30 to 90 KOH mg/g and glass transition temperature of 0 to 50 C, and 40 to 90% by mass of polyester resin (B) having an OH number of less than or equal to 10 KOH mg/g and a weight-average molecular weight of 1000 to 4000, and also having at least 10 mol % of the structural unit derived from isophthalic acid, with respect to 100 mol % that corresponds to the sum of all structural units derived from the alcohols constituting the polyester, and from polyvalent isocyanate;

it contains the structural unit of the following formula [I] in an amount of 1 mol % or less with respect to all alcohol-derived structural units:

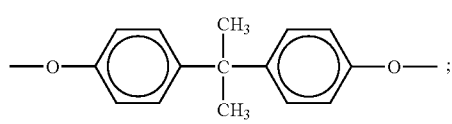

and the melting temperature is greater than or equal to 110 C.

The sixth aspect of the present invention is a binder resin for toner characterized in that the number-average, molecular weight of polyester (A) is 1000 to 4000, it contains 2 to 20 mol % of a structural unit derived from polyvalent alcohol with a molecular valence of 3 or higher, with respect to 100 mol % that corresponds to the sum of all units derived from the alcohols constituting the polyester, and the glass transition temperature of polyester (B) is 40 to 80 C.

The seventh aspect of the present invention is toners using the above-described binder resin for toner.

Since it is possible to obtain a binder resin for toner that has a low level of the bisphenol A structure and high performance such as excellent smear resistance according to these aspects of the invention, the industrial significance of the present invention is great.

BEST MODE FOR CARRYING OUT THE INVENTION

Hereinafter, the first to fourth aspects of the present invention will be first described in detail. Herein, the term "structural unit" will be sometimes simply referred to as "structure".

The binder resin for toner used in the present invention is characterized in that it has a structure of polyester, the structural unit of the following formula [I] is contained in an amount of 1 mol % or less with respect to all alcohol-derived structural units, the content of tin is less than or equal to 5 ppm, and the content of an element selected from titanium, germanium and aluminum is 10 ppm to 1500 ppm.

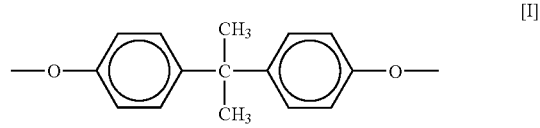

More particularly, it is preferred that the binder resin for toner of the present invention has the following constitution:

a polyester resin having a repeating structural unit represented by formula [[A]COO[B]O(CO)], wherein [Structure A] is a structure having an aliphatic, alicyclic or aromatic structure, at least 99 mol % of [Structure B] has the structure of formula [II]:

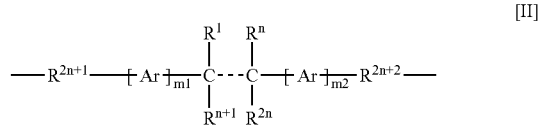

wherein, Ar is a group having an aromatic structure, $0 \leq m1 \leq 1$, $0 \leq m2 \leq 1$, $2 \leq n \leq 20$, and $R^1$–$R^{2n+2}$ are groups consisting of elements selected from carbon, hydrogen, oxygen, nitrogen, phosphorous and silicon, and/or covalent bonds, and they may join together to form a cyclic structure or a (double) bond;

the content of tin is less than or equal to 5 ppm; and the content of an element selected from titanium, germanium and aluminum is 10 ppm–1500 ppm.

The polyester resin of the present invention is typically obtained by the polycondensation reaction of a polybasic carboxylic acid or an acid anhydride thereof with a specific polyvalent alcohol. [Structure A] is derived from the carboxylic acid, and [Structure B] is derived from the alcohol.

For the carboxylic acid, preferred is a hydrocarbon compound having 1 to 20 carbon atoms in which 1 to 5 hydrogen atoms, preferably 1 to 3 hydrogen atoms are substituted by carboxylic acid groups. It is preferred that this hydrocarbon is an aliphatic, alicyclic or aromatic hydrocarbon. Specific examples include aliphatic dicarboxylic acids such as malonic acid, succinic acid, glutaric acid, adipic acid, azelaic acid and sebacic acid; unsaturated dicarboxylic acids such as maleic acid, fumaric acid, citraconic acid and itaconic acid; alicyclic dicarboxlic acids such as cyclohexanedicarboxylic acid; aromatic dicarboxlic acids such as terephthalic acid and isophthalic acid; and anhydrides of these dicarboxylic acids such as phthalic anhydride. It is also possible to use lower alkyl esters of these dicarboxylic acids in the polycondensation reaction. These lower alkyl esters may be used to obtain polyesters by the polycondensation reaction by transesterification with the polyvalent alcohols described below. Among these, preferred are aromatic dicarboxylic acids, and more preferably, terephthalic acid and isophthalic acid.

The polybasic carboxylic acids may be used in combination of two or more species.

It is also possible to use a monobasic carboxylic acid and a polybasic carboxylic acid for the purpose of controlling the molecular weight. As preferred monobasic carboxylic acids, mention may be made of aliphatic carboxylic acids such as octanoic acid, decanoic acid, dodecanoic acid, myristic acid, palmitic acid and stearic acid, and such acids may be optionally branched and may optionally have unsaturation. Further, these aliphatic monobasic carboxylic acids are preferably used to adjust the glass transition temperature since they have the property of lowering the grass transition temperature. In addition, aromatic carboxylic acids such as benzoic acid or naphthalenecarboxylic acid may be used. These monobasic carboxylic acids are used in an amount of from 0 to 30 mol %, preferably 0 to 15 mol %, relative to all carboxylic acids.

The monobasic carboxylic acid may be used in combination of two or more species.

Polybasic carboxylic acids with a molecular valence of 3 or higher are preferably used, since they have the effect of broadening the molecular weight distribution that will be described later, or the effect of inhibiting crystallization of resins. In particular, mention may be made of trimellitic acid, pyromellitic acid and their acid anhydrides, and especially trimellitic acid and its acid anhydride are preferred. These polybasic carboxylic acids with a molecular valence of 3 or higher are used in an amount of 0 to 30 mol %, preferably 1 to 30 mol %, more preferably 1 to 10 mol %, especially 2 to 10 mol %, relative to all carboxylic acids.

It is also possible to use them in combination of two or more species.

In the present invention, the [Structure A] portion of the polyester resin preferably is a structural unit derived from carboxylic acid and preferably has a structure in which 60 mol % or more of all the structural units derived from carboxylic acid comprise a structure derived from terephthalic acid, in view of the method of preparation of polyester resins using PET resins or the like as the raw material, which is to be described later, the cost of raw materials or supply stability associated with said method, as well as the toner performance. In addition, although it is possible to use those that are traditionally used in the preparation of polyester resins, it is preferable not to use any structure having the bisphenol A skeleton.

The alcohol preferably comprises a structure of the following formula [II]:

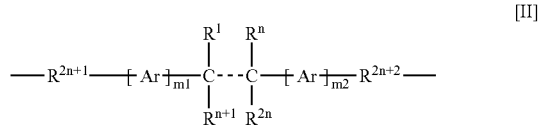

[II]

wherein, Ar is a group having an aromatic structure, $0 \leq m1 \leq 1$, $0 \leq m2 \leq 1$, $2 \leq n \leq 20$, and $R^1$ to $R^{2n+2}$ are groups consisting of elements selected from carbon, hydrogen, oxygen, nitrogen, phosphorous and silicon, and/or covalent bonds, and they may join together to form a cyclic structure or a (double) bond.

For the alcohol, mention may be made specifically of polyvalent alcohols such as ethylene glycol, 1,4-butanediol, 1,2-propylene glycol, 1,3-propylene glycol, 1,3-butanediol, 2,3-butanediol, diethylene glycol, triethylene glycol, dipropylene glycol, 1,5-pentanediol, 1,6-hexanediol, neopentyl glycol, 2-ethyl-1,3-hexanediol, trimethylolethane, cyclohexanedimethanol, hydrogenated bisphenol A, 1,4-cyclohexanedimethanol, hydroquinone, resorcine and phthalyl alcohol. Among these, preferred are neopentyl glycol, 2-ethyl-1,3-hexanediol, trimethylolethane, cyclohexanedimethanol, hydrogenated bisphenol A and 1,4-cyclohexanedimethanol which are branched and/or have cyclic structures, and particularly preferred is neopentyl glycol.

The polyvalent alcohols may be used in combination of two or more species.

These polyvalent alcohols, while being very useful in exhibiting excellent performance of the binder resin for toner, have a structure different from the structures of the compound with bisphenol A skeleton, in particular, bisphenol A, the bisphenol A-2-propylene oxide adduct, the biosphonel A-3-propylene oxide adduct, the biosphenol A-polypropylene oxide adduct, the bisphenol A-2-ethylene oxide adduct, the bisphenol A-3-ethylene oxide adduct and the biosphenol A-polyethylene oxide adduct. These alcohols with the biosphenol A structure are used in an amount of 1 mol % or less, preferably of 0 mol %, relative to all alcohols. When said amount exceeds 1 mol %, the smear resistance which will be described later may become insufficient.

It is also possible to use a monovalent alcohol and a polyvalent alcohol with a molecular valence of 3 or higher for the purpose of controlling the molecular weight of the polyester. As preferred monovalent alcohols, mention may be made of aliphatic monovalent alcohols such as octanol, decanol, dodecanol, myristyl alcohol, palmityl alcohol and stearyl alcohol, and such alcohols may be branched or may have unsaturation. These monovalent alcohols are used in an amount of from 0 to 25 mol %, preferably 0 to 15 mol %, relative to all alcohols.

Polyvalent alcohols with a molecular valence of 3 or higher are preferably used, since they have the effect of broadening the molecular weight distribution that will be described later, or the effect of inhibiting crystallization of resins. In particular, mention may be made of trimethylolpropane, glycerin, 2-methylpropanetriol, trimethylolethane, pentaerythritol, sorbit and sorbitan, and preferred are trimethylolpropane, glycerin, 2-methylpropanetriol and trimethylolethane, with trimethylolpropane being particularly preferred. These polyvalent alcohols with a molecular valence of 3 or higher are used in an amount of 1 to 25 mol %, preferably 1 to 20 mol %, more preferably 2 to 12 mol %, especially 2 to 10 mol %, relative to all alcohols.

Said monovalent alcohols or polyvalent alcohols with a molecular valence of 3 or higher may be used in combination of two or more species.

The polyester resin according to the present invention is typically obtained from said polybasic carboxylic acids and polyvalent alcohols, while other polyesters can also be used as the raw material, and it is preferable to prepare a polyester resin by depolymerization and polycondensation thereof. Particularly preferred polyester is polyethylene terephthalate (PET). This PET may be a recycled PET that has been collected from waste products. A typical recycled PET is one processed in the form of flakes, and its weight-average molecular weight is in the order of 30,000 to 90,000. Such PET is not limited in the molecular weight distribution, composition, method of preparation, morphology at the time of use, or the like, and it is not limited to recycled products.

Upon considering the reactivity of polycondensation to be described later, it is preferred that the content of such PET is greater than or equal to 40 mol %, in terms of the number of moles of ethylene glycol which is the alcoholic component derived from PET, when the number of moles of all alcoholic components in the polyester resin is taken as 100 mol %.

Further, it is preferable to comprise, as the alcohol component, at least ethylene glycol originating from PET, an alcohol having a branched structure and/or cyclic structure, and preferably neopentyl glycol; and for the content thereof, the sum of ethylene glycol, of the alcohol having a branched structure and/or cyclic structure, and preferably of neopentyl glycol is preferably 75 mol % or greater, when the number of moles of all alcoholic components is taken as 100 mol %.

The polycondensation reaction in obtaining a polyester resin according to the present invention may be carried out by any known method in an inert gas such as nitrogen gas, for example, high temperature polycondensation in the absence of solvent, solution polycondensation, or the like. The ratio of the acid monomers and the alcohol monomers used in the reaction, which is expressed as the ratio of the hydroxyl group of the latter to the carboxyl group of the former, is generally 0.7 to 1.4.

Further, when PET is used as the raw material, depolymerization of PET may be carried out in advance by adding a portion of the alcohol monomers to PET, and then after the polycondensation reaction may be carried out by adding the remaining portion of the alcohol monomers and the acid monomers; or alternatively the depolymerization reaction and the polycondensation reaction may be carried out simultaneously by adding PET, the alcohol monomers and the acid monomers all at once.

A catalyst is used in the process of carrying out the above-mentioned polycondensation reaction, or carrying out the polycondensation and depolymerization reactions upon preparation of a polyester resin. The catalyst is a catalyst containing an element selected from titanium, germanium and aluminum, and is different from the tin-based catalysts such as dibutyltin oxide, or the antimony-based catalysts such as antimony trioxide. Among these, preferred is the catalyst containing titanium and/or germanium, and more preferred is the catalyst containing titanium. As a catalyst containing titanium, it is more preferred to use titanium alkoxide, titanium acylate, titanium chelate, or the like, and it is particularly preferred to use tetra-n-butyl titanate, tetra (2-ethylhexyl) titanate, tetramethyl titanate or tetraisopropyl titanate. As a catalyst containing germanium, mention may be made of germanium dioxide or the like. Further, the amount of the catalyst added in this case is preferably 0.01% to 1.00% by mass. The catalysts may be used in combination of two or more species. There is no limit to the time of using the catalyst, and it may be used from the beginning of the polycondensation reaction or added during said reaction.

Specific product names of those corresponding to said titanium-containing catalysts may exemplified by, but not limited to, Orgatics TA-25 (tetra-n-butyl titanate), TA-30 (tetra(2-ethylhexyl) titanate), TA-70 (tetramethyl titanate), or the like for titanium alkoxides; Orgatics TPHS (polyhydroxytitanium stearate) or the like for titanium acylate; and Orgatics TC-401 (titanium tetraacetyl acetate), TC-200 (titanium octylene glycolate), TC-750 (titanium ethyl acetoacetate), TC-310 (titanium lactate), TC-400 (titanium triethanol aminate), or the like for titan chelate (all are products of Matsumoto Pharmaceutics Industry, Co., Ltd.).

A catalyst containing titanium is of excellent performance as the catalyst used in the above-mentioned polycondensation and depolymerization in the presence of polyester. Since a catalyst containing titanium is deactivated and is deprived of catalytic activity in the case of water being present in the system, such catalyst is known in general as the catalyst for transesterification reaction. In the process of carrying out polycondensation and depolymerization in the presence of polyester, less water is produced during the polycondensation reaction, and even if a catalyst containing titanium is used, the deactivation of the catalytic activity is suppressed. This is also the reason why it is preferred to use the polycondensation reaction and the depolymerization reaction in the presence of polyester, the raw material for which is represented by PET, upon preparation of the polyester resin according to the present invention using a titanium-containing catalyst.

The polyester resin according to the present invention is preferably prepared by carrying out polycondensation, or polycondensation and depolymerization at 200 C to 270 C. A more preferred temperature is in the range of 220 C to 260 C. When the reaction temperature is below 200 C, the solubility of the polyester during depolymerization, the raw material for which is represented by PET, is low, and thus the reaction time may be prolonged; or the solubility of the acid components such as terephthalic acid in polyvalent alcohols may become low. When the reaction temperature is above 270 C, decomposition of the raw materials may occur.

The binder resin for toner according to the present invention that uses the polyester resin thus obtained contains an element selected from titanium, germanium and aluminum in a content of 10 to 1500 ppm, and preferably 30 to 1000 ppm. Further, the content of tin in said polyester resin is 0 to 5 ppm. This originates from the tin that may be contained in recycled products when recycled products of polyester are used, the raw material for which is represented by PET. The more preferred value for said tin content is 0 ppm.

The analysis of metals in the above-mentioned resin can be confirmed using any known metal analytic method such as atomic absorption spectroscopy or plasma luminescence spectroscopy.

As mentioned above, the properties required from a toner include good fixing property, high strength, high cohesive power, high durability and prevention of offset onto the fixing roller, and as the method of making these properties coexist, broadening of the molecular weight distribution of the binding resin is highly recommended.

The molecular weight distribution can be controlled easily in a relatively broad scope by the use of the above-mentioned polybasic carboxylic acid with a molecular valence of 3 or higher or polyvalent alcohol with a molecular valence of 3 or higher.

The polyester resin according to the present invention is preferably of a peak molecular weight in the range of 1,000 to 20,000, inclusive. When the peak molecular weight is less than 1,000, the resin strength and cohesive power may be low, and the durability and offset resistance may be insufficient. When it is greater than 20,000, the fixing property may be insufficient.

The polyester resin of the present invention may include resins that are insoluble in a solvent. The term "solvent-insoluble portion" as used herein means the portion of the resin that is insoluble when dissolved in tetrahydrofuran (THF) as the solvent. This THF-insoluble portion is predominantly the portion of the polyester resin three-dimensionally crosslinked. The THF-insoluble portion is 0 to 40% by mass, preferably 1 to 40% by mass, and more preferably 1 to 25% by mass, while the THF-soluble portion is 100 to 60% by mass, preferably 99 to 60% by mass, and more preferably 99 to 75% by mass.

The molecular weight distribution of the THF-soluble portion is preferably 2 to 25, more preferably 2 to 20, and further more preferably 3 to 10. Further, the peak molecular weight is preferably in the range from 1000 to 20,000, inclusive. Also, the THF-soluble portion is contained, preferably among the structural units derived from alcohol, in the ratios of 80 to 100 mol % of the structural unit derived from diols (2AU1), and 0 to 20 mol % of the structural unit derived from triols (3AU1), when the sum of the structural units derived from said alcohols is taken to be 100 mol %.

Although the polyester resin containing said THF-insoluble portion has a substantially broad molecular weight distribution, since a part of the resin becomes insoluble during preparation, the solution viscosity is lowered, and thus it may become possible to obtain a polyester resin of broad molecular weight distribution with good productivity.

The THF-insoluble portion is contained, preferably among the structural units derived from alcohol, in the ratios of 70 to 99 mol % of the structural unit derived from diols (2AU2), and 1 to 30 mol % of the structural unit derived from triols (3AU2), when the sum of the structural units derived from the alcohols is taken to be 100 mol %.

Said THF-insoluble component is what is determined by the method described in the following Examples, and the proportion of the THF-soluble component contained therein is substantially less than or equal to 1% by mass. Further, the proportion of the THF-insoluble component contained in the THF-soluble component is substantially less than or equal to 1% by mass.

As a method of analyzing the structure of the THF-insoluble portion, the following method is preferably used, that is, a method in which the THF-insoluble portion is hydrolyzed with sulfuric acid or the like, and then the resulting component is subjected to structure analysis or quantification by any known method such as liquid chromatography (LC), gas chromatography (GC), nuclear magnetic resonance (NMR), infrared spectrometry (IR), or the like.

As a method of analyzing the structure of the THF-soluble portion, structure analysis and quantification may be carried out directly by LC, NMR, IR or the like, in addition to the above-mentioned method.

The polyester resin according to the present invention preferably has 0.1 to 10 mol %, and preferably 0.1 to 4 mol % of the structural units derived from isocyanate compounds, when the sum of all the structural units derived from acid and all the structural units derived from alcohol of polyester resin is taken to be 100 mol %. The units are mainly introduced by the method in which broadening of the molecular weight distribution is attempted by reacting and crosslinking a polyester resin with a polyvalent isocyanate to produce a component with increased molecular weight or a solvent-insoluble component (urethane extension method). As the polyvalent isocyanates used herein, mention may be made specifically of diisocyanates such as hexamethylene diisocyanate, isophorone diisocyanate, tolylene diisocyanate, diphenylmethane diisocyanate, xylene diisocyanate, tetramethylene diisocyanate, norbornene diisocyanate, and the like. It is also possible to use a polyvalent isocyanate with a molecular valence of 3 or higher. It is also possible to use the isocyanates in combination of two or more species.

Since the structural units derived from isocyanate compounds have high cohesive power between molecules, having good mechanical durability and exhibiting higher smear resistance is one of the reasons why the structural units are preferably used.

The isocyanate compounds are used in an amount of 0.1 to 10 mol %, and preferably 4 mol %, when the sum of all the structural units derived from carboxylic acid and all the structural units derived from alcohol is taken to be 100 mol %.

As a more preferred method of the urethane extension method, mention may be made of a method in which as a polyester resin, a polyester resin with a relatively higher OH number (a-0) and a polyester resin with a relatively lower polyester resin (a-2) are used in combination. In this method, since the polyester resin (a-0) is more likely to react with isocyanate than polyester resin (a-2), and increase in the molecular weight proceeds with priority, in addition to the effective broadening of the molecular weight distribution, the molecular weight distribution can be carried out easily, depending on the ratios of the used amounts of polyester resin (a-0) and of polyester resin (a-2). Upon considering the reactivity of the polyvalent isocyanate, the OH number of said polyester resin (a-0) has a lower limit of preferably 15 mg KOH/g, and more preferably 30 mg KOH/g. Meanwhile, the upper limit is preferably. 90 mg KOH/g, and more preferably 70 mg KOH/g. Also, the OH number of polyester resin (a-2) according to the present invention is preferably 10 mg KOH/g or less, and more preferably 7 mg KHO/g or less, since the reaction between the polyester resin and the polyvalent isocyanate is not impeded, and since the finally obtained binder resin for toner is well-balanced between good fixing property and the offset resistance.

Further, the OH number indicates the number of mg of potassium hydroxide required for neutralizing the acid anhydrides in the esterification of the OH group in 1 g of the resin. The measurement of the OH number is carried out by the reverse titration by any known acid anhydrides. In particular, the method which uses phthalic acid as the acid anhydride and imidazole as the catalyst is preferred, and as the solvent to dissolve these acid anhydride and catalyst, pyridine is used to form the reaction reagent. As the solvent to dilute the reaction reagent and the resin after reacting them, solvents with high solubility for the resin, such as pyridine or tetrahydrofuran, are used.

The method of using polyester resin (a-0) and polyester resin (a-2) of the present invention in combination will be described in detail.

In the above-mentioned method, urethane extension is achieved mainly by a reaction between polyester resin (a-0) and a polyvalent isocyanate, and as a result, urethane-modified polyester (ua-1) is produced. Here, it is preferable to use the polyvalent isocyanate in an amount of 1 mole equivalent or less, and more preferably 0.5 mole equivalent or less, in terms of the isocyanate group, with respect to 1 mole equivalent of the hydroxyl group of polyester resin (a-0). When the amount is greater than 1 mole equivalent, a safety problem may occur in which the increase in viscosity within the system becomes prominent, resulting in the lowering of the fixing property, and thus there is a possibility that the polyvalent isocyanate remains unreacted in the produced urethane-modified polyester resin.

The reaction between the polyester resin and the polyvalent isocyanate may use any known reaction devices without any limitation. Specifically, examples may include a reactor with stirrer, a twin-screw kneader or the like. Among these, it is preferable to use a kneading device such as the twin-screw kneader in view of the reaction efficiency or the homogeneity of the resin. The temperature in the kneader during the reaction is preferably 100 C or higher from the perspective of sufficiently completing the reaction.

The binder resin for toner thus obtained is a polyester resin which comprises the urethane-modified polyester resin (ua-1) subjected to urethane extension and polyester resin (a-2) as the main components. Such binder resin may be produced by, for example, a method of reacting polyester resin (a-0) and polyester resin (a-2) with a polyvalent isocyanate, in addition to the method in which the reaction between said polyester resin (a-0) and a polyvalent isocyanate is carried out in advance to obtain urethane-modified polyester resin (ua-1), and then polyester resin (a-2) is added by means of dry blending.

The binder resin for toner preferably has the THF-insoluble portion and the THF-soluble portion. The THF-insoluble portion is 1 to 40% by mass, and preferably 1 to 25% by mass, while the THF-soluble portion is 99 to 60% by mass, and preferably 99 to 75% by mass.

The THF-soluble portion is contained, preferably among the structural units derived from alcohol, in the ratios of 80 to 100 mol % of the structural unit derived from diol(2AU3), 0 to 20 mol % of the structural unit derived from triol (3AU3), and 0 to 10 mol % of the structural unit derived from isocyanate compound (IU3), when the sum of the structural units derived from alcohol is taken to be 100 mol %.

Further, said THF-insoluble portion is contained, preferably among the structural units derived from alcohol, in the ratios of 70 to 99 mol % of the structural unit derived from diol(2AU4), 1 to 30 mol % of the structural unit derived from triol (3AU4), and 0.1 to 35 mol % of the structural unit derived from isocyanate compound (IU4), when the sum of the structural units derived from said alcohols is taken to be 100 mol %.

Said THF-insoluble component is obtained by the method described later in the Examples, and the content of the THF-soluble component contained therein is substantially 1% by mass or less. Also, the proportion of the THF-insoluble component contained in the THF-soluble component is substantially 1% by mass or less.

The melting temperature of the binder resin for toner is greater than or equal to 110 C. Preferably, it is 110 C or higher and 180 C or lower, and more preferably 120 C or higher and 160 C or lower. By having the melting temperature within these ranges, the resin may satisfy the two performances of the fixing property and the offset resistance.

Next, the fifth and sixth aspects according to the present invention will be described in detail.

The fifth aspect of the invention is a binder resin for toner, characterized in that it is a urethane-modified polyester resin which is obtained from 10 to 60% by mass of polyester resin (A) having an OH number of 30 to 90 KOH mg/g and glass transition temperature of 0 to 50 C, and 40 to 90% by mass of polyester resin (B) having an OH number less than or equal to 10 KOH mg/g and a molecular weight of 1000 to 4000, and having at least 10 mol % of the structural unit derived from isophthalic acid with respect to 100 mol % that corresponds to the sum of all structural units derived from the alcohols constituting the polyester, and from a polyvalent isocyanate;

it contains the structural unit of the following formula [1] in an amount of 1 mol % or less with respect to all alcohol-derived structural units:

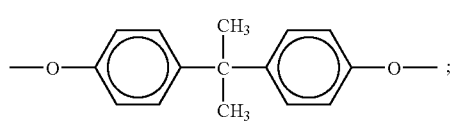

and the melting temperature is greater than or equal to 110 C.

The polyester resin (A) is preferably a polyester resin having a repeating structural unit represented by [[A]COO [B]O(CO)], wherein

[Structure A] has an aliphatic, alicyclic or aromatic structure,

[Structure B] is a structure of formula [II]:

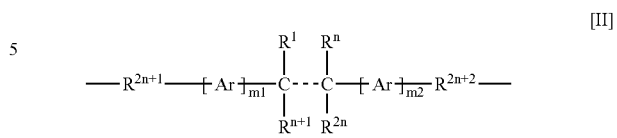

wherein, Ar is a group having an aromatic structure, $0 \leq m1 \leq 1$, $0 \leq m2 \leq 1$, $2 \leq n \leq 20$, and $R^1$ to $R^{2n+2}$ are groups consisting of elements selected from carbon, hydrogen, oxygen, nitrogen, phosphorous and silicon, and/or covalent bonds, and they may join together to form a cyclic structure or a (double) bond.

More specifically, the polyester resin (A) is generally obtained from a carboxylic acid or its anhydride and carboxylic ester corresponding to structure A, and from an alcohol corresponding to structure B. The carboxylic acid and its anhydride, carboxylic ester and alcohol may be specifically exemplified by those carboxylic acids, anhydrous carboxylic acids, carboxylic esters and alcohols described for the first aspect of the invention. Further, a preferred process for preparation of the polyester resin (A) may be exemplified by the process for preparation of polyester described for the first aspect of the invention.

The polyester resin (A) is preferably a structure in which at least 60 mol % of all the structures derived from carboxylic acids of polyester resin (A) comprise a structure derived from terephthalic acid, and at least 40 mol % of all the structures derived from alcohols comprise a structure derived from ethylene glycol, on consideration of the preparation process for the polyester resin which uses the above-described PET resin as the raw material, or the cost of raw materials and supply stability associated therewith, as well as the toner performance. Further, on consideration of smear resistance in the case of using the toner to be described later, it is preferable that at least 20 mol % of all the structures derived from alcohols is a structure derived from neopentyl glycol.

Polyester resin (A) is the component that is believed to attain high molecular weight mainly by reacting with a polyvalent isocyanate that will be described later. Owing to this, when the number of moles of all the structures derived from alcohols of polyester resin (A) is taken as 100 mol %, it is preferred that the proportion of the structure derived from a polyvalent alcohol with a molecular valence of 3 or higher, such as trimethylolpropane, as previously described, is 2 to 20 mol %, and preferably 2 to 12 mol %. When the amount of polyvalent alcohol with a molecular valence of 3 or higher is less than 2 mol %, it is difficult to attain high molecular weight in the urethanization reaction that will be described later, and the offset resistance may become insufficient. On the other hand, when the amount is more than 20 mol %, gelled portion increases, and the fixing property becomes poor. Meanwhile, the OH number of polyester resin (A) is 30 to 90 KOH mg/g. In the present invention, when the OH number is less than 30 KOH mg/g, the amount reacting with the polyvalent isocyanate becomes small, that is, the urethane component decreases in amount, and the development durability of the toner may become poor. When it exceeds 90 KOH mg/g, the molecular weight of polyester resin (A) tends to lower, making it difficult to attain high molecular weight, and the offset resistance may become poor.

The glass transition temperature of polyester resin (A) is 0 to 50 C. When the glass transition temperature is lower than 0 C, the anti-blocking property may become poor; when it is higher than 50° C., the fixing property may become poor.

In addition, a preferred molecular weight of polyester resin (A) as the number-average molecular weight (B) is 1000 to 4000. If the number-average molecular weight is less than 1000, Tg is excessively lowered and it is susceptible to cause blocking, and if it exceeds 4000, the fixing property may become poor.

The polyester resin (B) previously described is, preferably similar to polyester resin (A), a polyester resin having a repeating structural unit represented by [[A]COO[B]O(CO)], wherein

[Structure A] has an aliphatic, alicyclic or aromatic structure,

[Structure B] is a structure of formula [II]:

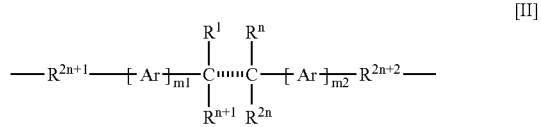

wherein, Ar is a group having an aromatic structure, $0 \leq m1$, $0 \leq m2 \leq 1$, $2 \leq n \leq 20$, and $R^1$ to $R^{2n+2}$ are groups consisting of elements selected from carbon, hydrogen, oxygen, nitrogen, phosphorous and silicon, and/or covalent bonds, and they may join together to form a cyclic structure or a (double) bond. The preferred carboxylic acids used for preparation thereof, anhydrous carboxylic acids, carboxylic esters and alcohols are the same as those exemplified for the first aspect of the invention. However, it is characterized in that it comprises, as the structure derived from carboxylic acid, the structure derived from isophthalic acid in an amount of at least 10 mol % of all the structural units derived from alcohol in polyester resin (B).

For said polyester resin (B), upon considering the preparation method of the polyester resin which uses the above-described PET resin as the raw material, and the cost of raw materials and supply stability associated therewith as well as the toner performance, it is preferred that at least 60 mol %, and preferably 60 to 90 mol % of all the structures derived from carboxylic acid in polyester resin (B) comprise a structure derived from terephthalic acid, and it is preferred that at least 40 mol % of all the structures derived from alcohol comprise a structure derived from ethylene glycol. Further, on considering the smear resistance when used in a toner as described below, at least 20 mol % of all the structures derived from alcohol preferably comprise a structure derived from neopentyl glycol.

Polyester resin (B) is a component that is mainly believed to contribute to the low temperature fixing property when used in a toner, since it does not react with a polyvalent isocyanate that will be described later. Polyester resin (B) is characterized in that it comprises 10 mol % or more of a structure derived from isophthalic acid, when the number of moles of all the structures derived from alcohol is taken as 100 mol %. It is preferably 10 mol % or greater and 40 mol % or less. By having a structure as described above, crystallization of polyester resin (B) can be avoided, and consequently it is possible to obtain a binder resin for toner with good fixing property, as described below. Moreover, by having such a structure, it is possible to exhibit good pulverizability upon being made into a toner. The OH number of polyester resin (B) is 10 KOH mg/g or less, and preferably 7 KOH mg/g or less. When the OH number exceeds 10 KOH mg/g, the fixing property may be reduced, owing to high polymerization of the resin resulting from the reaction with polyvalent isocyanate.

The molecular weight of polyester resin (B) is 1000 to 4000 as the number-average molecular weight. If the number-average molecular weight is less than 1000, Tg is excessively lowered and it is susceptible to cause blocking, and if it exceeds 4000, the fixing property may become poor.

Further, the preferred glass transition temperature of polyester resin (B) is 40 to 80 C. If the glass transition temperature is lower than 40 C, the anti-blocking property may become poor; and if it is higher than 80° C., the fixing property may become poor.

Also, the content ratio by mass of polyester resin (A) to polyester resin (B) of the present invention, (A):(B), is 10:90–60:40, and 10:90–40:60 is particularly preferred. At a content of polyester resin (A) of less than 10% by mass, the offset resistance may become poor; and at a content of polyester resin (A) of greater than 60% by mass, the fixing property may be poor.

In the fifth aspect of the invention, there is no particular limitation for the catalyst used in the preparation of polyester resin (A) and polyester resin (B), but from the perspectives of environmental protection as previously mentioned or of the methods for preparation of polyester resins using PET as previously mentioned, it is preferable to use a catalyst containing an element selected from titanium, germanium or aluminum; more preferable is a catalyst containing titanium and/or germanium; and particularly preferable is a catalyst containing titanium. Its amount to be used is preferably 0.01 to 1.00% by mass with respect to the raw materials such as polyester resin, carboxylic acid, alcohol, or the like. The content of the element in the binder resin for toner as described later is preferably 10 ppm to 1500 ppm, and more preferably 30 to 1000 ppm.

The content of tin in the polyester resin is preferably 0 to 5 ppm, and more preferably 0 ppm. As described above, said tin originates from that contained in the raw material, when recycled products of polyester are used as the raw material.

The binder resin for toner in the fifth aspect of the invention is obtained from said polyester resin (A), polyester resin (B) and polyvalent isocyanate. For the polyvalent isocyanate, specific mention may be made of the same ones exemplified for the first aspect of the invention. Also, for the methods for preparation of the binder resin for toner from polyester resin (A), polyester resin (B) and polyvalent isocyanate, the same method as that mentioned for the first aspect of the invention may be taken as an example.

In the binder resin for toner in the fifth aspect of the invention, the structural unit derived from a compound having the bisphenol A skeleton comprises 1 mol % or less, preferably 0 mol %, of all structural units derived from alcohol. If said structural unit exceeds 1 mol %, the smear resistance which will be described later may be insufficient.

The melting temperature of the binder resin for toner in the fifth aspect of the invention is 110° C. or higher, and preferably 110 C or higher and 180° C. lower. The resin having the melting temperature within said range may satisfy both the fixing property and the offset resistance.

The binder resin for toner for the fifth aspect of the invention contains 1 to 40%, preferably 1 to 25%, by mass of the THF-insoluble components.

The THF-soluble portion is contained in the resin, preferably in the ratios of:

greater than or equal to 5 mol %, preferably 5 to 40 mol %, of the structural units derived from isophthalic acid (IAU5);

80 to 100 mol % of the structural units derived from diol (2AU5) and 0 to 20 mol % of the structural units derived from triol (3AU5) among the structural units derived from alcohol; and 0 to 10 mol % of the structural units derived from an isocyanate compound (IU5), with respect to the sum of the structural units derived from alcohol being taken as 100 mol %.

Further, the THF-insoluble portion is contained in the resin, preferably in the ratios of:

70 to 99 mol % of the structural units derived from diol (2AU6) and 1 to 30 mol % of the structural units derived from triol (3AU6) among the structural units derived from alcohol; and 0.1 to 35 mol % of the structural units derived from an isocyanate compound (IU6), with respect to the sum of the structural units derived from alcohol as 100 mol %.

The THF-insoluble components are obtained by the method described in the Examples that will be described later, and the THF-soluble components contained therein constitutes substantially 1% by mass or less. Also, the proportion of the THF-insoluble components contained in the THF-soluble components is substantially 1% by mass or less.

The respective compositions of the THF-insoluble components and of the THF-soluble components in the binder resin for toner in the fifth aspect of the invention are within the same scopes as those for the binder resin for toner in the first aspect.

The binder resins for toner in the first to sixth aspects of the invention may preferably comprise polyolefin waxes such as polyethylene wax and polypropylene wax, for the purpose of enhancing the performance of preventing offset on the roller, and the amount of addition is preferably in the range of 0 to 10% by mass of the binder resin for toner.

The specific product names corresponding to said polyolefin waxes may be mentioned to include, but not limited to, HI-WAX 800P, 400P, 200P, 100P, 720P, 420P, 320P, 405 MP, 320 MP, 4051E, 2203A, 1140H, NL800, NP055, NP105, NP505, NP805, etc. available from Mitsui Chemicals Inc.

Moreover, the binder resin for toner of the present invention may contain natural waxes such as ceramic wax, rice wax, sugar wax, lacquer wax, beeswax, carnauba wax, candelilla wax, Montan wax or the like, and the amount of addition thereof is preferably 0 to 10% by mass of the binder resin for toner.

Within the scope not impairing the effect of the present invention, it is also possible to add other resins than said polyester resins, such as styrene copolymers, polyol resins, polyurethane resins, polyamide resins, silicone resins or the like, in the binder resin for toner of the present invention.

Hereinafter, a detailed description will be given for the toner, the seventh aspect of the invention.

The toner of the present invention contains at least the binder resin for toner of the present invention as described above, charge controlling agents (CCA), colorants and surface treating agents.

The amount of the binder resin for toner of the present invention is preferably 50 to 95% by mass of the toner.

Hereinafter, components other than the binder resin for toner will be described in detail.

First, for the colorants, dyes and pigments conventionally known in the art may be used, and specific examples may include carbon black, magnetite, phthalocyanine blue, peacock blue, permanent red, lake red, rhodamine lake, Hanza yellow, permanent yellow, benzidine yellow, nigrosin dye (C.I. NO. 50415), aniline blue (C.I. No. 50405), charcoal blue (C.I. No. azoec Blue 3), chrome yellow (C.I. NO. 14090), ultramarine blue (C.I. No. 77103), Du Pont oil red (C.I. No. 26105), Orient oil red #330 (C.I. No. 60505), quinoline yellow (C.I. NO. 47005), methylene blue chloride (C.I. NO. 52015), phthalocyanine blue (C.I. NO. 74160), Malachite green oxalate (C.I. No. 42000) or the like. The amount of addition is preferably 3–15 part by mass with respect to 100 parts by mass of the binder resin for toner.

For the charge controlling agent, any known charge controlling agent, including nigrosin, quaternary ammonium salts or metal-containing azo dyes, may be appropriately selected and used, and the amount used is 0.1 to 10 parts by mass with respect to 100 parts by mass of the binder resin for toner, as typically used in the art.

Next, for the surface treating agent, examples include fine powders of colloidal silica, alumina, titanium oxide, polytetrafluoroethylene, polyvinylidene chloride, polymethyl methacrylate, polystyrene microparticles, silicone or the like, and the amount of addition is preferably 0.1 to 20 parts by mass with respect to 100 parts by mass of the binder resin for toner.

The toner of the present invention may contain polyolefin wax, and the amount thereof is 0 to 10 parts by mass with respect to 100 parts by mass of the binder resin for toner. As polyolefin wax, specific examples include those described for the binder resin for toner in the first to sixth aspects of the invention.

In the process for preparation of the toner of the present invention using these materials, the binder resin for toner of the present invention, colorants and other additives, as appropriate, are sufficiently mixed in a powder mixer, and then the components are thoroughly mixed by melting and kneading using a heating roll, a kneader, or a kneading device called extruder. After cooling this mixture, pulverization and sieving is carried out, particles typically having a size of 8 to 20 µm are collected, and a surface treating agent is applied onto the particles by powder mixing method to yield a toner.

The toner obtained by the present invention may be used in a variety of development processes, for example, cascade development technique, magnetic brush technique, powder cloud technique, touchdown technique, so-called microtoning technique employing as a carrier a magnetic toner prepared by pulverization, so-called bipolar magnetic toner technique in which a desired toner charge is obtained by frictional charging between magnetic toners, or the like, and are not intended to be limited by these.

Further, the toner obtained by the present invention may be used with various fixing techniques. Specifically, examples include oil-less heat rolling, oil-applied heat rolling, flashing, ovening, pressure fixing, or the like. Especially oil-less heat rolling and flashing are preferred.

Moreover, the toner of the present invention may be used with various cleaning techniques such as the fur brush technique, blade technique or the like.

The toner of the present invention is excellent in the fixing property and the offset resistance, and surprisingly is also excellent in smear resistance. Smearing property indicates the fixed image, that is, the degree of transfer of the fixed toner to other paper. More specifically, it indicates the phenomenon in which the fixed toner is subjected to friction with other paper, thus the surface of this toner soiling the paper. A toner with excellent smear resistance results in very little transfer of image, that is, less soiling of other paper, when a sheet of paper with fixed image is contacted with other sheet of paper. Because of this, even when many sheets of printed documents are prepared by double-sided printing or double-sided copying, the toner practically does not soil the image on other sheet of paper and is very preferable in practice.

EXAMPLES

Hereinbelow, the present invention will be explained by the Examples in more detail, but the present invention is not intended to be limited to these Examples. Meanwhile, the term "parts" as used herein indicates percentage by mass (% by mass), unless indicated otherwise.

The melting temperature of the binder resin for toner according to the present invention was determined as follows. Measurement is performed under the following conditions using Shimadzu Flow Tester CFT500D (product of Shimadzu Corporation).

pore on the die: 1 mm in diameter, 1 mm in length
size of sample: 1 cm$^3$
rate of temperature rise: 6 C/min
load: 20 kg/cm$^2$ Then, from the temperature-piston stroke(sample outflow) curve, ½ of the difference between the piston stroke values for the temperature at the start of outflow and for the temperature at the end of outflow is determined, and the temperature at the piston stroke value is determined. This temperature was taken as the melting temperature.

The glass transition temperature (Tg) in the present invention was measured by differential scanning calorimetry (DSC) using DSC-20 (Seiko Electronic Industry Co. Ltd.). About 10 mg of the sample was subjected to temperature elevation from −20 C to 100 C at a rate of 10 C/min, and Tg was determined at the intersection of the baseline of the curve obtained and the gradient of the endothermic peak. Prior to this measurement of temperature elevation, it is preferable to unify the thermal history of the resin by carrying out the operation of first elevating the temperature of the resin to about 200 C, and after maintaining the resin at the temperature for 5 minutes, immediately cooling the resin to room temperature (25 C).

In the present invention, the amounts of the THF-insoluble component and of the THF-soluble component are determined as follows. Using about 2.5 g of the resin and about 47.5 g of THF, a solution with a concentration of about 5% by mass is prepared (hereinafter, the concentration of said solution is referred to as "RC". RC is a value determined from the precisely weighed values of the mass of the resin and of the mass of THF). That is to say, the mixture is stirred at 25±3 C for 12 hours to dissolve the soluble component completely. Then, the solution thus obtained was settled for 16 hours. After the insoluble portion is separated from the supernatant, the supernatant is analyzed for concentration (hereinafter, the concentration of the supernatant is referred to as "SC". This value is calculated from the precisely weighed value of measuring about 5 g of the supernatant, and from measured value of the mass of the resin remained after the removal of tetrahydrofuran by drying at 150° C. for 1 hour).

The values for the THF-insoluble component and the THF-soluble component can be determined from the RC value and the SC value by the following equation.

Ratio of the THF-soluble component=$(SC/RC) \times 100$ (%)

Ratio of the THF-insoluble component=$[(RC-SC)/RC] \times 100$ (%)

Then, the supernatant was removed by decantation from this solution, and the residue was washed several times with THF. This residue was dried under reduced pressure at 40 C to yield the THF-insoluble component.

The acid number as used herein indicates the number of mg of potassium hydroxide required to neutralize 1 g of the resin. The measurement of the acid number was determined by neutralization titration. Five grams of the sample was dissolved in 50 cc of a mixed solvent of xylene/dimethylformamide (1/1 ratio by mass), a few drops of the phenolphthalein/ethanol solution was added as an indicator, and then titration was performed with an aqueous solution of 1/10 N KOH. The moment when the color of the sample solution turned from colorless to purple was taken as the completion point, and the acid number (mg KOH/g) was estimated from the titration amount and the mass of the sample.

Further, the measurement of the OH number in the present invention was performed by reverse titration involving the following acid anhydride. To 2 g of the resin, 5 cc of the phthalized reagent (produced in the proportions of pyridine 500 cc/phthalic acid 70 g/imidazole 10 g) prepared separately was added and dissolved, and then the solution was settled at 100 C for 1 hour. Then, to this resin solution, 1 cc of water, 70 cc of tetrahydrofuran, and a few drops of phenolphthalein/ethanol solution were added, and titration with an aqueous solution of 0.4 N NaOH was carried out. The moment when the color of the sample solution turned from colorless to purple was taken as the completion point, and the OH number (KOH mg/g) was estimated from the titration amount and the mass of the sample. In addition, the quantitative analysis for metals in the resin according to the present invention was carried out by the high-frequency plasma luminescence analysis device SPS1200A (available from Seiko Electronic Industry Co., Ltd.).

The measurements of the molecular weight of the resin and of the molecular weight distribution in the present invention were carried out by means of GPC. The measurement was carried out under the following conditions, using commercially available monodisperse standard polystyrene.

Detector: SHODEX RI-71S
Solvent: tetrahydrofuran
Column: KF-G+KF-807L×3+KF800D (connected in series)
Flow rate: 1.0 ml/min,
Sample: 0.25% THF solution Meanwhile, the reliability of the measurements can be confirmed as the ratio Mw/Mn of the NBS706 polystyrene sample (Mw=288,000, Mn=137,000, Mw/Mn=2.11) is obtained as 2.11±0.10 under the above measurement conditions.

Preparative Example 1 for Polyester Resin

In a 5-L four-necked flask equipped with a reflux cooler, a water separator, a nitrogen gas inlet, thermometer and a stirrer, 67 mol % of recycled PET (weight-average molecular weight: 75000) in the form of flakes, in terms of the ethylene glycol unit in PET, 21 mol % of neopentyl glycol, 12 mol % of trimethylolpropane, 32 mol % of terephthalic acid, 9 mol % of benzoic acid, and 0.2% by mass of tetra(2-ethylhexyl)titanate (product of Matsumoto Pharmaceutical Industry Co., Ltd.; Orgatics TA-30) were placed, and the depolymerization and dehydrative polycondensation reactions were carried out at 250 C while introducing nitrogen into the flask. At the point where the acid number of the reaction product reached a predetermined value, the reaction product was withdrawn from the flask, cooled and pulverized to yield Resin 1. Tg and melting temperature of thus obtained resin were 58.4 C and 131 C, respectively.

Preparative Example 2 for Polyester Resin

In a 5-L four-necked flask equipped with a reflux cooler, a water separator, a nitrogen gas inlet, thermometer and a stirrer, 64 mol % of recycled PET (weight-average molecular weight: 75000) in the form of flakes, in terms of the ethylene glycol unit in PET, 22 mol % of neopentyl glycol, 14 mol % of trimethylolpropane, 38 mol % of terephthalic acid, 7 mol % of benzoic acid, and 0.3% by mass of tetra-n-butyl titanate (product of Matsumoto Pharmaceutical Industry Co., Ltd.; Orgatics TA-25) were placed, and the depolymerization and dehydrative polycondensation reactions were carried out at 250° C. while introducing nitrogen into the flask. At the point where the acid number of the reaction product reached a predetermined value, the reaction product was withdrawn from the flask, cooled and pulverized to yield Resin 2. Tg and melting temperature of thus obtained resin were 60.4 C and 141 C, respectively.

Preparative Example 3 for Polyester Resin

In a 5-L four-necked flask equipped with a reflux cooler, a water separator, a nitrogen gas inlet, thermometer and a stirrer, 60 mol % of recycled PET (weight-average molecular weight: 75000) in the form of flakes, in terms of the ethylene glycol unit in PET, 30 mol % of neopentyl glycol, 10 mol % of trimethylolpropane, 35 mol % of terephthalic acid, 10 mol % of benzoic acid, and 0.5% by mass of tetraisopropyl titanate (product of Matsumoto Pharmaceutical Industry Co., Ltd.; Orgatics TA-10) were placed, and the depolymerization and dehydrative polycondensation reactions were carried out at 250 C while introducing nitrogen into the flask. At the point where the acid number of the reaction product reached a predetermined value, the reaction product was withdrawn from the flask, cooled and pulverized to yield Resin 3. Tg and melting temperature of thus obtained resin were 61.2° C. and 124 C, respectively.

Preparative Example 4 for Polyester Resin

In a 5-L four-necked flask equipped with a reflux cooler, a water separator, a nitrogen gas inlet, thermometer and a stirrer, 63 mol % of recycled PET (weight-average molecular weight: 75000) in the form of flakes, in terms of the ethylene glycol unit in PET, 27 mol % of the product under the name Actocol KB300 (product of Mitsui-Takeda Chemical Industries, Ltd.: propylene oxide adduct of bisphenol A), 10 mol % of trimethylolpropane, 31 mol % of terephthalic acid, 12 mol % of benzoic acid, and 0.5% by mass of dibutyltin oxide were placed, and the depolymerization and dehydrative polycondensation reactions were carried out at 250° C. while introducing nitrogen into the flask. At the point where the acid number of the reaction product reached a predetermined value, the reaction product was withdrawn from the flask, cooled and pulverized to yield Resin 4. Tg and melting temperature of thus obtained resin were 60.4 C and 124 C, respectively.

The results of preparation of the above-mentioned resins are summarized in Table 1.

TABLE 1

Preparative Examples for polyester resins

| Resin | | 1 | 2 | 3 | 4 |
|---|---|---|---|---|---|
| PET(mol %) | | 67 | 64 | 60 | 63 |
| Neopentyl glycol(mol %) | | 21 | 22 | 30 | — |
| KB 300(mol %) | | — | — | — | 27 |
| Trimethylol propane(mol %) | | 12 | 14 | 10 | 10 |
| Terephthalic acid(mol %) | | 32 | 38 | 35 | 31 |
| Benzoic acid(mol %) | | 9 | 7 | 10 | 12 |
| Catalyst | | Tetra(2-ethylhexyl) titanate | Tetra-n-butyl-titanate | Tetra-isopropyl titanate | Di-butyltin oxide |
| Amount of catalyst(% by mass) | | 0.2 | 0.3 | 0.5 | 0.5 |
| Tg(° C.) | | 58.4 | 60.4 | 61.2 | 60.4 |
| Melting temperature(° C.) | | 131 | 141 | 124 | 125 |
| THF-soluble portion | (% by mass) | 96 | 93 | 98 | 97 |
| | 2AU1(mol %) | 90 | 89 | 91 | 90 |
| | 3AU1(mol %) | 10 | 11 | 9 | 10 |
| THF-insoluble portion | (% by mass) | 4 | 7 | 2 | 3 |
| | 2AU2(mol %) | 87 | 84 | 87 | 88 |
| | 3AU2(mol %) | 13 | 16 | 13 | 12 |

Hereinbelow, Example 1 will be described in detail as a representative example for the mode of carrying out the invention. The same procedure as in Example 1 was taken for Resins 2–4, that is, Examples 2, 3 and Comparative Example 1, and the resins and toners obtained therefrom were evaluated. The results of evaluation are summarized in Table 2.

Example 1

To 100 parts by mass of Resin 1, 6 parts by mass of carbon black (MA-100; product of Mitsubishi Chemical Corp.), 1.5 parts of charge controlling agent (BONTRON E-84; product of Orient Chemical Co., Ltd.), and 2.0 parts of polypropylene wax (HI-WAX NP105; product of Mitsui Chemicals) were dispersed and mixed in a Henschel mixer, and then the mixture was melted and kneaded at 120 C in a double-screw kneader, PCM-30 (product of Ikegai Machinery Co.) to provide a toner composition in the form of lump. This toner composition was crude pulverized in a hammer mill, and was in turn finely pulverized in a jet pulverizer (product of Nippon Pneumatics Co., IDS2 type), and then classified using a pneumatic classifier to obtain a fine powder of toner having an average particle size of 10 μm (5 μm or lower: 3% by mass, 20 μm or higher: 2% by mass). Next, to 100 parts by mass of said toner, hydrophobic silica (R-972, product of Aerosil Co.) was added from an external source in a ratio of 0.5 parts by mass, and this mixture was mixed in a Henschel mixer to obtain a toner. Using the particles of this toner, the fixing property, offset resistance and smear resistance were investigated according to methods (1), (2) and (3) described below.

(1) Fixing Property

After preparing an unfixed image with a copier machine remodeled from a commercially available electrophotographic copier machine, this unfixed image was fixed using the heat roller fixing device built by remodeling the fixing part of a commercially available copier machine. The fixing rate of the heat roller was set to 200 mm/sec, and the temperature of the heat roller was changed by 5 C to carry out the fixing of toner. Thus obtained fixed image was subjected to friction with a sand eraser (Tombow Pencils Co.) for 10 times under a load of 0.5 kg of weight, and the image density of before and after the friction test was measured by a Macbeth-type reflective densitometer. The lowest fixing temperature, at each of which the rate of change of the image density was greater than or equal to 70%, was taken as the lowest fixing temperature. Further, the heat roller fixing device used herein did not have the silicone oil supplying device. The environmental conditions were set to ambient temperature and ambient pressure (temperature: 22 C, relative humidity: 55%).

1: lowest fixing temperature≦180 C
2: 200 C≧lowest fixing temperature>180 C
3: lowest fixing temperature>200 C Among these, "1" was of the level usable as commercial product.

(2) Smear Resistance

According to the evaluation of the fixing property, an unfixed image was prepared, and this unfixed image was fixed by means of a heat roller fixing device. Fixing of the toner was carried out at a fixing rate of heat roller of 250 mm/sec and at a heat roller temperature of 170° C. The solid black powder of the obtained fixed image (I.D.=1.35 to 1.45; measured by a Macbeth-type densitometer) was subjected to friction with a sheet of commercially available copier paper, by going to/from for three times under a load of 500 g weight. The degree of contamination of the copier paper after the friction test was identified by measuring the image density (I.D.) of the copier paper with a Macbeth-type reflective densitometer. The environmental conditions were set to ambient temperature and ambient pressure (temperature: 22° C., relative humidity: 55%).

1: I.D.≦0.9 (less contamination)
2: 1.2≧I.D.>0.9
3: I.D.>0.12 (severe contamination)

Among these, "1" and "2" are of the level usable as commercial product.

(3) Offset Resistance

The evaluation of the offset resistance was carried out in accordance with the measurement of the above-mentioned lowest fixing temperature; specifically, the operation in which, after an unfixed image was prepared with the copier machined as described above, the fixing process was carried out by the above-described heat roller fixing device by transferring the toner image, a sheet of white copier paper was sent to the corresponding heat roller fixing device under the same conditions, and then it was visually observed whether there occurs any contamination by toner on the copier paper, was repeated in the state where the set temperature of the heat roller of the heat roller fixing device was successively elevated. The lowest set temperature at which toner contamination occurred was taken as the offset occurring temperature. The environmental conditions were set to ambient temperature and ambient pressure (temperature: 22 C, relative humidity: 55%).

1: offset occurring temperature≧210 C
2: 210 C>offset occurring temperature≧170 C
3: 170 C>offset occurring temperature Among these, "1" is of the level usable as commercial product.

As is obvious from the results of Table 2, toners 1–3 using the binder resins for toner prepared according to the present invention were excellent not only in the fixing property and offset resistance but also smear resistance.

TABLE 2

| | Evaluation Results for toner | | | |
|---|---|---|---|---|
| Example/Comp. Example No. | Example 1 | Example 2 | Example 3 | Comp. Example 1 |
| Resin | Resin 1 | Resin 2 | Resin 3 | Resin 4 |
| Fixing property | 1 | 1 | 1 | 1 |
| smear resistance | 2 | 2 | 2 | 3 |
| Offset resistance | 1 | 1 | 1 | 1 |

Next, preparation and evaluation of the binder resins for toner of the urethane-modified polyester type and the toners were carried out. For the evaluation of toner, the fixing property, offset resistance, smear resistance and development durability were tested. The evaluation of the fixing property and offset resistance was carried out according to the procedures. (4) and (5) below, by changing the evaluation conditions. Also, the evaluation of development durability was carried according to the procedure (6) below. Specific terms for these evaluation procedures are described below.

(4) Fixing Property

After preparing an unfixed image with a copier machine remodeled from a commercially available electrophotographic copier machine, this unfixed image was fixed using the heat roller fixing device built by remodeling the fixing part of a commercially available copier machine. The fixing rate of the heat roller was set to 300 mm/sec, and the temperature of the heat roller was changed by 5 C to carry out the fixing of toner. Thus obtained fixed image was subjected to friction with a sand eraser (Tombow Pencils Co.) for 10 times under a load of 0.5 kg of weight, and the image density of before and after the friction test was measured by a Macbeth-type reflective densitometer. The lowest fixing temperature, at each of which the rate of change of the image density was greater than or equal to 70%, was taken as the lowest fixing temperature. Further, the heat roller fixing device used herein did not have the silicone oil supplying device. The environmental conditions were set to ambient temperature and ambient pressure (temperature: 22 C, relative humidity: 55%).

1: lowest fixing temperature≦160 C
2: 170 C≧lowest fixing temperature>160 C
3: 180 C≧lowest fixing temperature>170 C
4: 190 C≧lowest fixing temperature>180 C
5: lowest fixing temperature>190 C Among these, "1" to "4" were of the level usable as commercial product.

(5) Offset Resistance

The evaluation of the offset resistance was carried out in accordance with the measurement of the above-mentioned lowest fixing temperature described in Section (4); specifically, the operation in which, after an unfixed image was prepared with the copier machined described above, the fixing process was carried out by the above-described heat roller fixing device by transferring the toner image, a sheet of white copier paper was sent to the corresponding heat roller fixing device under the same conditions, and then it was visually observed whether there occurs any contamination by toner on the copier paper, was repeated in the state where the set temperature of the heat roller of the heat roller fixing device was successively elevated. The lowest set temperature at which toner contamination occurred was taken as the offset occurring temperature. The environmental conditions were set to ambient temperature and ambient pressure (temperature: 22 C, relative humidity: 55%).

1: offset occurring temperature≧240 C

2: 240 C>offset occurring temperature≧220 C

3: 220 C>offset occurring temperature≧210 C

4: 210 C>offset occurring temperature

Among these, "1", "2" and "3" are of the level usable as commercial product.

(6) Development Durability

After performing a photographic test continuously for 100,000 sheets of paper with a commercially available copier machine (product of Toshiba, Precio 5560), an evaluation was carried out on the number of sheets at which deterioration of the image density and image quality begins.

1: no deterioration at 70,000 sheets or more

2: deterioration in the range of 50,000 to less than 70,000 sheets

3: deterioration at less than 50,000 sheets

Among these, "1" and "2" are of the level usable as commercial product.

Preparative Example for Urethane-Modified Polyester Resin (1)

The preparation of polyester resins (a-0) and (a-2) was carried out in the following manner. A specific illustration on the procedure for Resin a0-1 will be presented. Resins a0-2, a0-3 and a2-1 to a2-5 were obtained by the same procedure as in that for Resin a0-1, except that the catalyst, amount of catalyst addition and the monomer composition were changed to the blending ratios indicated in Table 3 and Table 4. The acid numbers and the OH numbers of the resins thus obtained are also presented in Table 3 and Table 4.

In a 5-L four-necked flask equipped with a reflux cooler, a water separator, a nitrogen gas inlet, thermometer and a stirrer, with respect to 100 mol % of the number of moles of all alcoholic components, 43 mol % of recycled PET (weight-average molecular weight: 75000) in the form of flakes, in terms of the ethylene glycol unit in PET, 43 mol % of neopentyl glycol, 9 mol % of triethylene glycol, 5 mol % of trimethylolpropane, 48 mol % of terephthalic acid, and 0.2% by mass of tetra(2-ethylhexyl) titanate (product of Matsumoto Pharmaceutical Co., Ltd.; Orgatics TA-30) were placed, and the depolymerization and dehydrative polycondensation reactions were carried out at 250° C. while introducing nitrogen into the flask. At the point where the acid number of the reaction product reached the value indicated in Table 3, the reaction product was withdrawn from the flask, cooled and pulverized to yield Resin a0-1.

TABLE 3

| Preparative Example for polyester resin (a-0) | | | |
|---|---|---|---|
| Resin | a0-1 | a0-2 | a0-3 |
| PET(mol %) | 43 | 58 | 50 |
| Neopentyl glycol(mol %) | 43 | 25 | — |
| Bisphenol A-2-propylene oxide adduct(mol %)* | — | — | 21 |
| Triethylene glycol(mol %) | 9 | 9 | 18 |
| Trimethylol propane(mol %) | 5 | 8 | 8 |
| Terephthalic acid(mol %) | 48 | 33 | 34 |
| Catalyst | Tetra(2-ethylhexyl) titanate | Tetra-n-butyl titanate | Dibutyltin oxide |
| Amount of catalyst(wt %) | 0.2 | 0.1 | 0.5 |
| Acid number(mg KOH/g) | 8 | 11 | 8 |
| OH number(mg KOH/g) | 54 | 62 | 59 |

*Product name: Actocol KB-300

Hereinbelow, Example 4 will be described in detail as a representative example for the mode of carrying out the invention. The same procedure as in Example 4 was taken for Resins 6 to 12, that is, Examples 5–8 and Comparative Examples 2 to 4, and the resins and toners obtained therefrom were evaluated. For these, the blending ratios of Resins (a-0) and (a-2) or the amount of addition of tolylene diisocyanate, the results for resin evaluation, for quantitative analysis of metal contents in the resins and for toner characteristics evaluation are presented in Table 5 along with Example 4.

Example 4

30% by mass of Resin a0-1, 70% by mass of Resin a2-1 and 2.2% by mass of tolylene diisocyanate were fed to a double-screw extruder-kneader (product of Kurimoto, Ltd., KEX-40) at a total resin flow rate of 20 kg/h, and a kneading reaction was carried out at a temperature of 180 C and at a screw rotation of 150 rpm, to yield urethane-modified polyester resin 5. Thus obtained resin had Tg of 58.4 C and a melting temperature of 144 C.

To 100% by mass of urethane-modified polyester resin 5, 6% by mass of carbon black (MA-100; product of Mitsubishi Chemical Corp.), 1.0% by mass of charge controlling agent (BONTRON E-84; product of Orient Chemical Co., Ltd.), and 2.0% by mass of polypropylene wax (HI-WAX NP105; product of Mitsui Chemicals) were dispersed and mixed in a Henschel mixer, and then the mixture was melted and kneaded at 120 C and at 150 rpm in a double-screw kneader, PCM-30 (product of Ikegai Machinery Co.) to provide a toner composition in the form of lump. This toner composition was crude pulverized in a hammer mill, and was in turn finely pulverized in a jet pulverizer (product of Nippon Pneumatics Co., IDS2 type) and then classified using a pneumatic classifier to obtain a fine powder of toner having an average particle size of 10 μm (5 μm or lower: 3% by mass, 20 μm or higher: 2% by mass). Next, to 100% by mass of said toner, hydrophobic silica (R-972, product of Aerosil Co.) was added from an external source in a ratio of 0.5% by mass, and this mixture was mixed in a Henschel mixer to obtain a toner. Using the particles of this toner, the fixing property, smear resistance, offset resistance and development durability were investigated. The results are presented in Table 5.

As is obvious from the results of Table 5, the toners using the binder resins 5 to 9 for toner prepared according to the present invention were excellent not only in the fixing property, offset resistance and development durability but also smear resistance.

Next, preparation and evaluation of the binder resins for toner using other urethane-modified polyester resins and the toners were carried out. For the evaluation, the following test items were added in addition to the smear resistance, fixing property (4), offset resistance (5) and development durability.

3: 50% of the particle size being greater than or equal to 10 μm to less than 11.5 μm 4: 50% of the particle size being greater than or equal to 11.5 μm Among these, "1", "2" and "3" are of the levels usable as commercial product.

(8) Anti-Blocking Property

The degree of cohesion of the toner powder after storage for 3 days at a temperature of 50 C was evaluated visually.

1: no blocking
2: partial blocking
3: severe blocking

Among these, "1" and "2" are of the level usable as commercial product.

Preparative Example for Urethane-Modified Polyester Resin (2)

TABLE 5

Evaluation results for the properties of the binder resins for toner and of toners

| Example/Comp. Example No. | Example 4 | Example 5 | Example 6 | Example 7 | Example 8 | Comp. Example 2 | Comp. Example 3 | Comp. Example 4 |
|---|---|---|---|---|---|---|---|---|
| Resin | Resin 5 | Resin 6 | Resin 7 | Resin 8 | Resin 9 | Resin 10 | Resin 11 | Resin 12 |
| Resin a-0 | | | | | | | | |
| Type | a0-1 | a0-2 | a0-2 | a0-1 | a0-1 | a0-3 | a0-2 | a0-1 |
| (% by mass) | 30 | 40 | 35 | 25 | 50 | 45 | 25 | 30 |
| Resin a-2 | | | | | | | | |
| Type | a2-1 | a2-2 | a2-3 | a2-4 | a2-2 | a2-3 | a2-5 | a2-5 |
| (% by mass) | 70 | 60 | 65 | 75 | 50 | 55 | 75 | 70 |
| Tolylene diisocyanate (% by mass) | 2.2 | 2.5 | 1.8 | 1.5 | 3.6 | 3.7 | 1.9 | 2.4 |
| Tg (° C.) | 58.4 | 62.8 | 58.3 | 56.1 | 57.2 | 60.3 | 58.7 | 57.6 |
| Melting temperature (° C.) | 144 | 149 | 128 | 122 | 131 | 138 | 123 | 135 |
| Metal content (ppm) | | | | | | | | |
| Sn | 0 | 0 | 0 | 0 | 0 | 1062 | 1721 | 697 |
| Ti | 235 | 186 | 928 | 441 | 207 | 753 | 29 | 116 |
| Fixing property(4) | 2 | 2 | 2 | 2 | 2 | 2 | 2 | 2 |
| smear resistance | 1 | 1 | 1 | 1 | 1 | 3 | 3 | 3 |
| Offset resistance(5) | 1 | 1 | 1 | 1 | 1 | 1 | 1 | 1 |
| Development durability | 1 | 1 | 1 | 1 | 1 | 1 | 1 | 1 |
| THF-soluble | | | | | | | | |
| (% by mass) | 90 | 86 | 95 | 97 | 94 | 92 | 97 | 93 |
| 2AU3 (mol %) | 95 | 88 | 93 | 96 | 95 | 93 | 96 | 96 |
| 3AU3 (mol %) | 5 | 12 | 7 | 4 | 5 | 7 | 4 | 4 |
| IU3 (mol %) | 3 | 3 | 2 | 2 | 5 | 6 | 3 | 4 |
| THF-insoluble | | | | | | | | |
| (% by mass) | 10 | 14 | 5 | 3 | 6 | 8 | 3 | 7 |
| 2AU4 (mol %) | 95 | 92 | 94 | 92 | 95 | 92 | 92 | 95 |
| 3AU4 (mol %) | 5 | 8 | 6 | 8 | 5 | 8 | 8 | 5 |
| IU4 (mol %) | 13 | 12 | 10 | 14 | 13 | 15 | 23 | 17 |

(7) Toner Pulverizability

The particle size distribution of the fine particles obtained by finely pulverizing by a jet pulverizer, a product of Nippon Pneumatics Co. (Type 1 mill) was measured with a Coulter counter and was graded as follows by means of the 50% particle size.

1: 50% of the particle size being greater than or equal to 6.5 μm and less than or equal to 8.5 μm 2: 50% of the particle size being greater than or equal to 8.5 μm to less than 10 μm Preparation of polyester resin (A) and (B) was carried out by the following procedure. A specific illustration on Resin A-1 will be presented. Resins A-2 to A-7 and B-1 to B-7 were obtained by the same procedure as in that for Resin A-1, except that the monomer composition was changed to the blending ratios indicated in Table 6 and Table 7. The acid numbers, OH numbers, Tg and Mn of the resins thus obtained are also presented in Table 6 and Table 7.

TABLE 6

Preparative Example for polyester resin (A)

| | Feed composition | | | | | Property of resin (A) | | | |
|---|---|---|---|---|---|---|---|---|---|
| Resin No. | PET (mol %) | Neopentyl glycol (mol %) | Triethylene glycol (mol %) | Trimethylol propane (mol %) | Terephthalic acid (mol %) | Acid number (mgKOH/g) | OH number (mgKOH/g) | Tg (° C.) | Mn |
| A-1 | 60 | 25 | 8 | 7 | 28 | 7 | 68 | 38 | 2700 |
| A-2 | 65 | 20 | 8 | 7 | 26 | 8 | 61 | 44 | 3400 |
| A-3 | 60 | 27 | 10 | 3 | 29 | 5 | 52 | 43 | 3300 |
| A-4 | 61 | 26 | 9 | 4 | 25 | 11 | 78 | 26 | 1500 |
| A-5 | 60 | 32 | 8 | — | 28 | 10 | 57 | 36 | 2300 |
| A-6 | 59 | 35 | — | 6 | 32 | 5 | 62 | 54 | 3200 |
| A-7 | 60 | 32 | 5 | 3 | 35 | 9 | 26 | 41 | 4700 |

TABLE 7

Preparative Example for polyester resin (B)

| | Feed composition | | | | | Property of resin (B) | | | |
|---|---|---|---|---|---|---|---|---|---|
| Resin No. | PET (mol %) | Neopentyl glycol (mol %) | Isophthalic acid (mol %) | Terephthalic acid (mol %) | Benzoic acid (mol %) | Acid number (mgKOH/g) | OH number (mgKOH/g) | Tg (° C.) | Mn |
| B-1 | 70 | 30 | 32 | — | 6 | 25 | 3 | 56 | 2500 |
| B-2 | 70 | 30 | 23 | — | 10 | 4 | 7 | 50 | 3200 |
| B-3 | 70 | 30 | 32 | — | 12 | 34 | 4 | 44 | 1300 |
| B-4 | 70 | 30 | 38 | — | 10 | 38 | 5 | 61 | 3100 |
| B-5 | 70 | 30 | — | 32 | 8 | 23 | 4 | 55 | 2200 |
| B-6 | 70 | 30 | 30 | — | — | 15 | 6 | 68 | 4500 |
| B-7 | 70 | 30 | 37 | — | 8 | 25 | 12 | 63 | 3700 |

In a 5-L four-necked flask equipped with a reflux cooler, a water separator, a nitrogen gas inlet, thermometer and a stirrer, with respect to 100 mol % of the number of moles of all alcoholic components, 60 mol % of recycled PET (weight-average molecular weight: 75000) in the form of flakes, in terms of the ethylene glycol unit in PET, 25 mol % of neopentyl glycol, 8 mol % of triethylene glycol, 7 mol % of trimethylolpropane, 28 mol % of terephthalic acid, and 0.3% by mass of tetra(2-ethylhexyl) titanate (product of Matsumoto Pharmaceutical Industry Co., Ltd.; Organics TA-30) were placed, and the depolymerization and dehydrative polycondensation reactions were carried out at 250 C while introducing nitrogen into the flask. At the point where the acid number of the reaction product reached the value indicated in Table 6, the reaction product was withdrawn from the flask, cooled and pulverized to yield Resin A-1.

Hereinbelow, Example 9 will be described in detail as a representative example for the mode of carrying out the invention. The same procedure as in Example 1 was taken for Resins 14 to 29, that is, Examples 10 to 24 and Comparative Example 5, and the resins and toners obtained therefrom were evaluated. For these, the blending ratios of the polyester resin (A) and the polyester resin (B), or the amount of addition of tolylene diisocyanate, the results for resin evaluation (Tg and melting temperature), for quantitative analysis of metal contents in the resins and for toner characteristics evaluation are presented in Table 8 and Table 9 along with Example 9.

TABLE 8

Evaluation results for the properties of the binder resins for toner and for toners

| Example/Comp. Example No. | | Example 9 | Example 10 | Example 11 | Example 12 | Example 13 | Example 14 | Example 15 | Example 16 | Example 17 |
|---|---|---|---|---|---|---|---|---|---|---|
| | Resin | Resin 13 | Resin 14 | Resin 15 | Resin 16 | Resin 17 | Resin 18 | Resin 19 | Resin 20 | Resin 21 |
| Resin A | Type | A-1 | A-1 | A-1 | A-2 | A-3 | A-4 | A-1 | A-2 | A-3 |
| | (% by mass) | 30 | 15 | 50 | 40 | 30 | 25 | 30 | 60 | 35 |
| Resin B | Type | B-1 | B-1 | B-1 | B-2 | B-3 | B-4 | B-2 | B-4 | B-2 |
| | (% by mass) | 70 | 85 | 50 | 60 | 70 | 75 | 70 | 40 | 65 |
| Tolylene diisocyanate (% by mass) | | 2.5 | 1.8 | 3.2 | 2.8 | 2.6 | 4.5 | 1.7 | 3.1 | 1.7 |
| | Tg (° C.) | 57.9 | 56.8 | 58.6 | 59.8 | 51.1 | 63.3 | 56.1 | 60.4 | 54.9 |
| | Melting temperature (° C.) | 138 | 131 | 151 | 139 | 128 | 152 | 125 | 127 | 119 |
| Metal content (ppm) | Sn | 0 | 0 | 0 | 0 | 0 | 0 | 0 | 0 | 0 |
| | Ti | 241 | 252 | 239 | 254 | 251 | 248 | 257 | 254 | 249 |

TABLE 8-continued

Evaluation results for the properties of the binder resins for toner and for toners

| Example/Comp. Example No. | | Example 9 | Example 10 | Example 11 | Example 12 | Example 13 | Example 14 | Example 15 | Example 16 | Example 17 |
|---|---|---|---|---|---|---|---|---|---|---|
| Fixing property (4) | | 1 | 1 | 1 | 1 | 1 | 1 | 1 | 1 | 1 |
| smear resistance | | 1 | 1 | 1 | 1 | 1 | 1 | 1 | 1 | 1 |
| Offset resistance (5) | | 1 | 2 | 1 | 1 | 1 | 1 | 1 | 1 | 2 |
| Development durability | | 1 | 1 | 1 | 1 | 1 | 1 | 1 | 1 | 1 |
| Pulverizability | | 1 | 1 | 1 | 1 | 1 | 1 | 1 | 1 | 1 |
| Anti-blocking property | | 1 | 1 | 1 | 1 | 2 | 1 | 1 | 1 | 1 |
| THF-soluble | (% by mass) | 91 | 94 | 84 | 88 | 95 | 86 | 97 | 92 | 96 |
| | 2AU5 (mol %) | 99 | 100 | 97 | 98 | 100 | 100 | 98 | 97 | 99 |
| | 3AU5 (mol %) | 1 | 1 | 3 | 2 | 4 | 4 | 2 | 3 | 1 |
| | IU5 (mol %) | 3 | 1 | 4 | 4 | 3 | 3 | 3 | 4 | 3 |
| | IAU5 (mol %) | 24 | 30 | 21 | 16 | 24 | 33 | 17 | 21 | 16 |
| THF-insoluble | (% by mass) | 9 | 8 | 16 | 12 | 5 | 14 | 3 | 8 | 4 |
| | 2AU6 (mol %) | 93 | 93 | 93 | 93 | 97 | 96 | 93 | 93 | 97 |
| | 3AU6 (mol %) | 7 | 7 | 7 | 7 | 3 | 4 | 7 | 7 | 3 |
| | IU6 (mol %) | 16 | 26 | 12 | 12 | 16 | 32 | 16 | 15 | 13 |

TABLE 9

Evaluation results for the properties of the binder resins for toner and for toners

| Example/Comp. Example No. | | Example 18 | Example 19 | Example 20 | Example 21 | Example 22 | Example 23 | Example 24 | Comp. Example 5 |
|---|---|---|---|---|---|---|---|---|---|
| | Resin | Resin 22 | Resin 23 | Resin 24 | Resin 25 | Resin 26 | Resin 27 | Resin 28 | Resin 29 |
| Resin A | Type | A-5 | A-6 | A-7 | A-1 | A-1 | A-1 | A-2 | A-4 |
| | (% by mass) | 40 | 35 | 30 | 35 | 35 | 35 | 80 | 5 |
| Resin B | Type | B-1 | B-1 | B-1 | B-5 | B-6 | B-7 | B-1 | B-1 |
| | (% by mass) | 60 | 65 | 70 | 65 | 65 | 65 | 20 | 95 |
| Tolylene diisocyanate (% by mass) | | 2.7 | 2.5 | 2.4 | 2.4 | 2.3 | 2.5 | 5.1 | 1.8 |
| Tg (° C.) | | 59.4 | 66.4 | 59.1 | 58.7 | 63.1 | 61.2 | 58.7 | 53.4 |
| Melting temperature (° C.) | | 134 | 142 | 124 | 134 | 136 | 134 | 129 | 109 |
| Metal content (ppm) | Sn | 0 | 0 | 0 | 0 | 0 | 0 | 0 | 0 |
| | Ti | 253 | 248 | 254 | 253 | 249 | 254 | 255 | 242 |
| Fixing property (4) | | 1 | 4 | 2 | 4 | 4 | 4 | 4 | 3 |
| smear resistance | | 1 | 1 | 1 | 1 | 1 | 1 | 1 | 2 |
| Offset resistance (5) | | 3 | 3 | 3 | 1 | 1 | 1 | 1 | 4 |
| Development durability | | 1 | 1 | 1 | 1 | 1 | 1 | 2 | 3 |
| Pulverizability | | 2 | 2 | 1 | 3 | 3 | 3 | 3 | 4 |
| Anti-blocking property | | 1 | 1 | 1 | 1 | 1 | 1 | 2 | 3 |
| THF-soluble | (% by mass) | 88 | 86 | 96 | 92 | 93 | 91 | 85 | 97 |
| | 2AU5 (mol %) | 100 | 99 | 100 | 98 | 98 | 98 | 95 | 100 |
| | 3AU5 (mol %) | 0 | 1 | <1 | 2 | 2 | 2 | 5 | <1 |
| | IU5 (mol %) | 3 | 3 | 3 | 4 | 3 | 3 | 8 | 1 |
| | IAU5 (mol %) | 21 | 24 | 22 | 0 | 21 | 27 | 8 | 31 |
| THF-insoluble | (% by mass) | 12 | 14 | 4 | 8 | 7 | 9 | 15 | 3 |
| | 2AU6 (mol %) | 100 | 94 | 97 | 93 | 93 | 93 | 93 | 96 |
| | 3AU6 (mol %) | 0 | 6 | 3 | 7 | 7 | 7 | 7 | 4 |
| | IU6 (mol %) | 15 | 12 | 21 | 12 | 16 | 14 | 12 | 71 |

Example 9

30% by mass of Resin A-1, 70% by mass of Resin B-1 and 2.5% by mass of tolylene diisocyanate, were fed to a double-screw extruder-kneader (product of Kurimoto, Ltd., KEX-40) at a total resin flow rate of 20 kg/h, and a kneading reaction was carried out at a temperature of 175° C. and at a screw rotation of 150 rpm, to yield a urethane-modified polyester resin 13.

To 100% by mass of this urethane-modified polyester resin 13, 6% by mass of carbon black (MA-100; product of Mitsubishi Chemical Corp.), 1.0% by mass of charge controlling agent (BONTRON E-84; product of Orient Chemical Co., Ltd.), and 2.0% by mass of polypropylene wax (HI-WAX NP105; product of Mitsui Chemicals) were dispersed and mixed in a Henschel mixer, and then the mixture was melted and kneaded at 120° C. and at 150 rpm in a double-screw kneader, PCM-30 (product of Ikegai Machinery Co.) to provide a toner composition in the form of lump. This toner composition was crude pulverized in a hammer mill, and was in turn finely pulverized in a jet pulverizer (product of Nippon Pneumatics Co., IDS2 type) and then classified using a pneumatic classifier to obtain a fine powder of toner having an average particle size of 8.5 μm. Next, to 100% by mass of said toner, hydrophobic silica (R-972, product of Aerosil Co.) was added from an external source in a ratio of 0.5% by mass, and this mixture was mixed in a Henschel mixer to obtain a toner. Using the particles of this toner, the fixing property, offset resistance and development durability were investigated.

As is obvious from the results in Table 8 and Table 9, the toners using resins 1 to 9 for toner prepared according to the present invention all have excellent balance of toner performance.

The invention claimed is:

1. A binder resin for toner comprising a polyester structure comprising a structure derived from carboxylic acid and a structure derived from alcohol, wherein
the polyester structure contains the structural unit of the following formula [I] in an amount of 1 mol % or less with respect to all the structural units derived from alcohol:

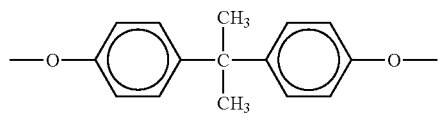

the content of tin is 5 ppm or less;
the content of an element selected from titanium, germanium and aluminum ranges from 10 ppm to 1500 ppm;
the melting temperature is 110° C. or higher, and
the resin further comprises 0.1 to 10 mol % of a structural unit derived from isocyanate compound based on the sum of all the structural units derived from carboxylic acid and of all the structural units derived from alcohol equaling 100 mol %.

2. The binder resin for toner according to claim 1, wherein binder resin comprises 0 to 40% by mass of THF-insoluble components and 100 to 60% by mass of THF-soluble components.

3. The binder resin for toner according to claim 1, wherein
at least 60 mol % of the structures derived from carboxylic acid comprise a structure derived from terephthalic acid,
at least 40 mol % of the structural units derived from alcohol comprise a structure derived from ethylene glycol, and
at least 75 mol % of the structural units derived from alcohol comprise structures derived from ethylene glycol and neopentyl glycol.

4. The binder resin for toner comprising a polyester structure comprising a structure derived from carboxylic acid and a structure derived from alcohol, wherein the binder resin is obtained
from 10 to 60% by mass of polyester resin (A) having an OH number of 30 to 90 KOH mg/g and glass transition temperature of 0 to 50° C., and
40 to 90% by mass of polyester resin (B) having an OH number of 10 KOH mg/g or less and a molecular weight of 1000 to 4000, and comprising at least 10 mol % of a structure derived from isophthalic acid, with respect to 100 mol % of all the units derived from the alcohol constituting the polyester, and
from polyvalent isocyanate;
the structural unit of the following formula [I] constitutes 1 mol % or less of all the structural units derived from alcohol;

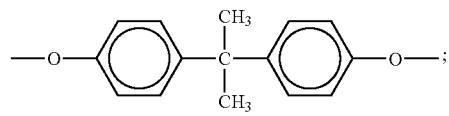

and
the melting temperature is 110° C. or higher.

5. The binder resin for toner according to claim 4, wherein polyester (A) has a number-average molecular weight of 1000 to 4000 and comprises 2 to 20 mol % of structural units derived from polyvalent alcohol with a molecular valence of 3 or higher, with respect to 100 mol % of all the units derived from the alcohol constituting the polyester; and that polyester (B) has a glass transition temperature of 40 to 80° C.

6. A toner comprising the binder resin for toner described in claim 4.

7. A toner comprising the binder resin for toner described in claim 1.

* * * * *